June 16, 1959
A. D. L. HUTCHINSON
2,890,909
SEMI TRAILER DUMP TRUCK
Filed March 12, 1956
4 Sheets-Sheet 1
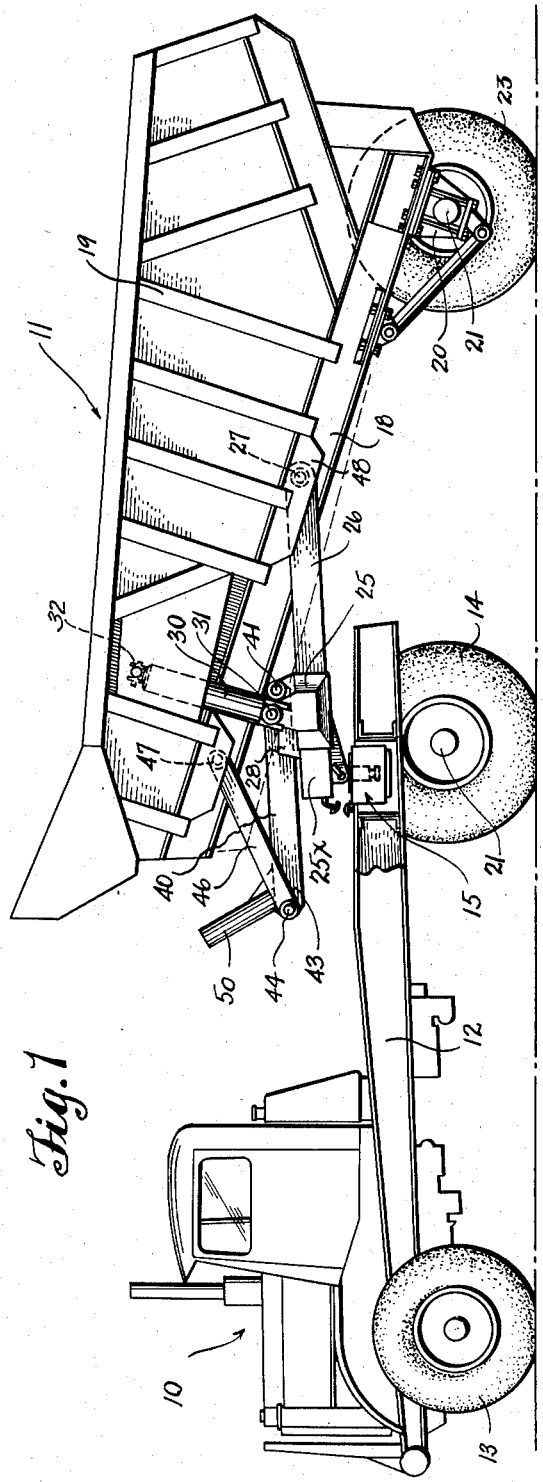
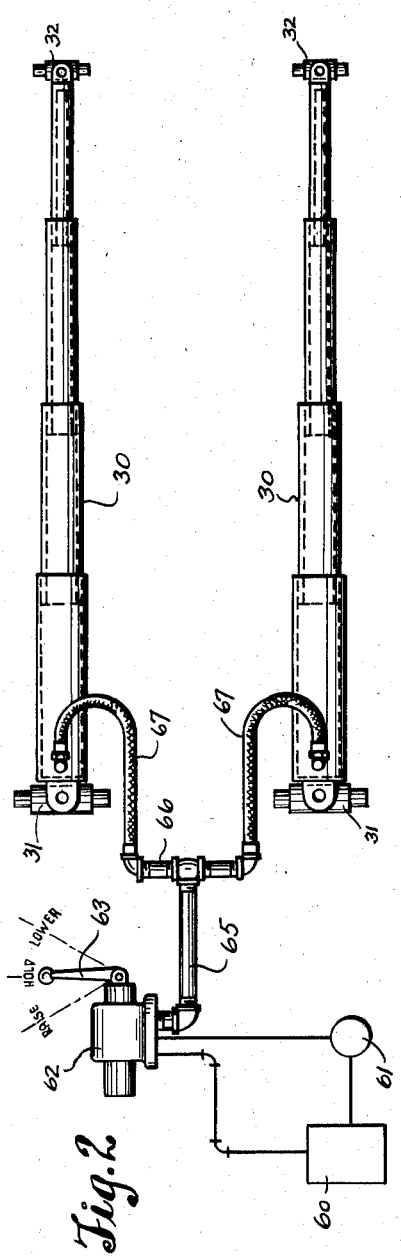
INVENTOR.
ARCHIBALD D.L. HUTCHINSON
BY
Cook + Robinson
ATTORNEYS

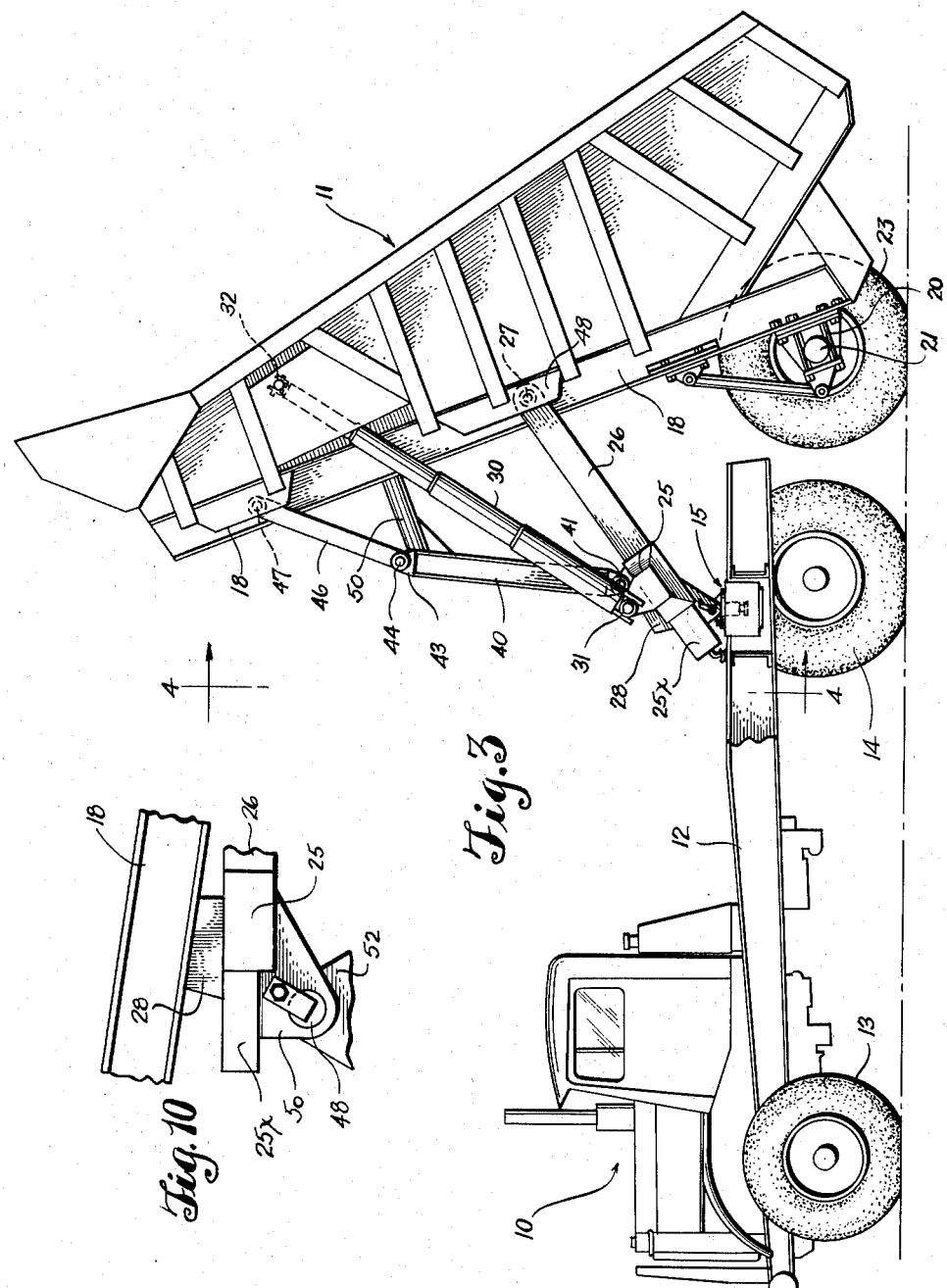

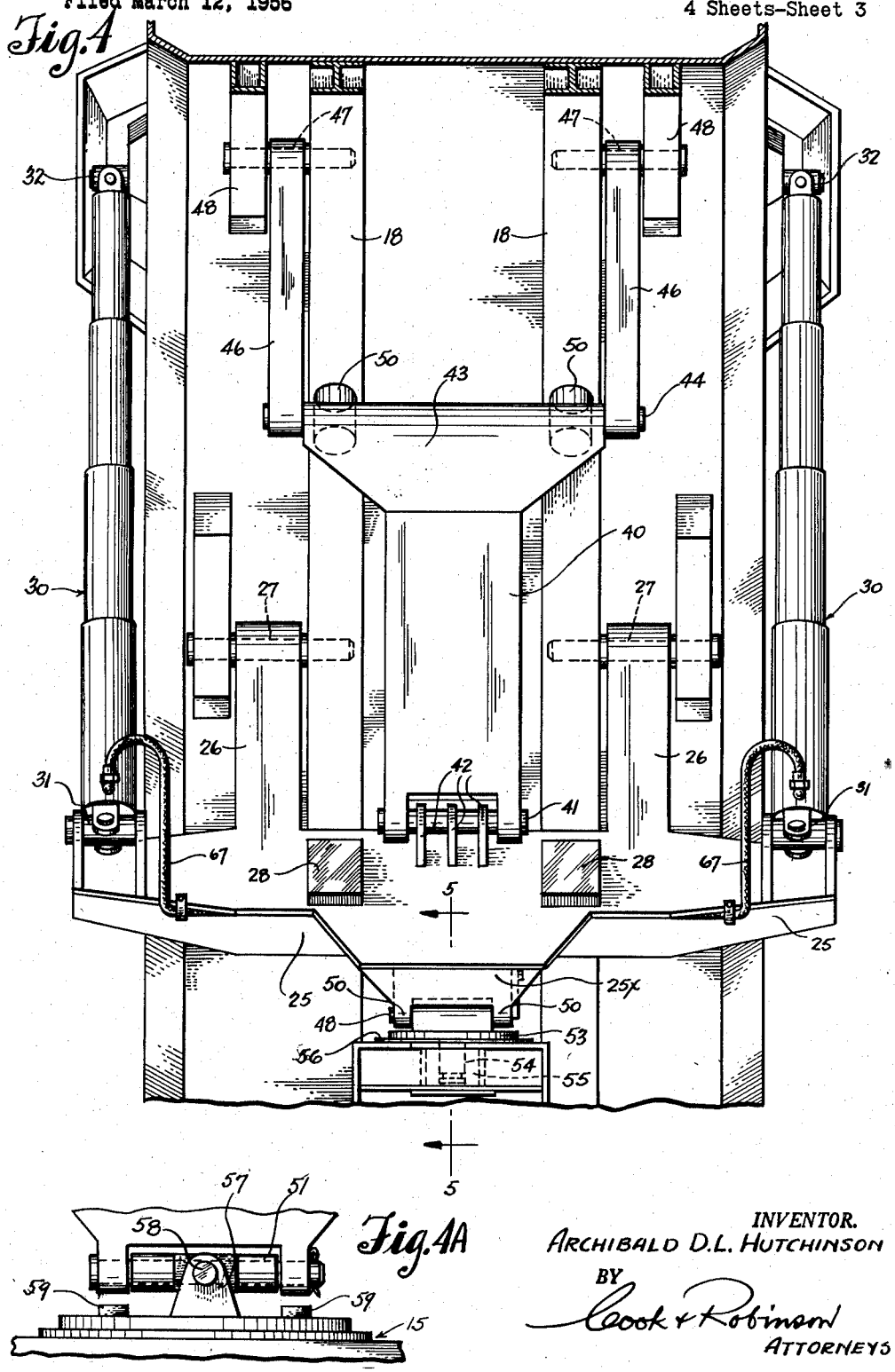

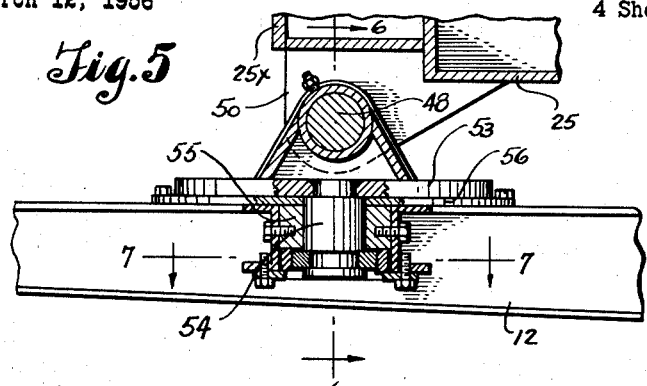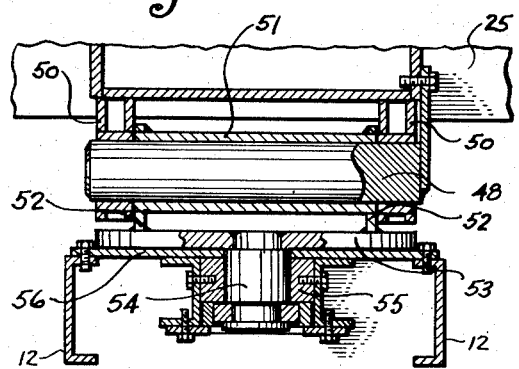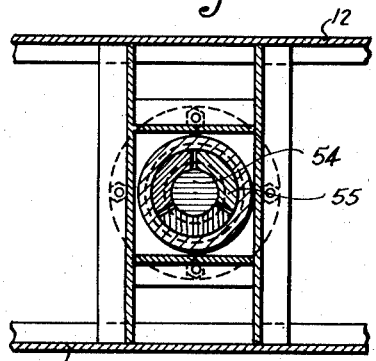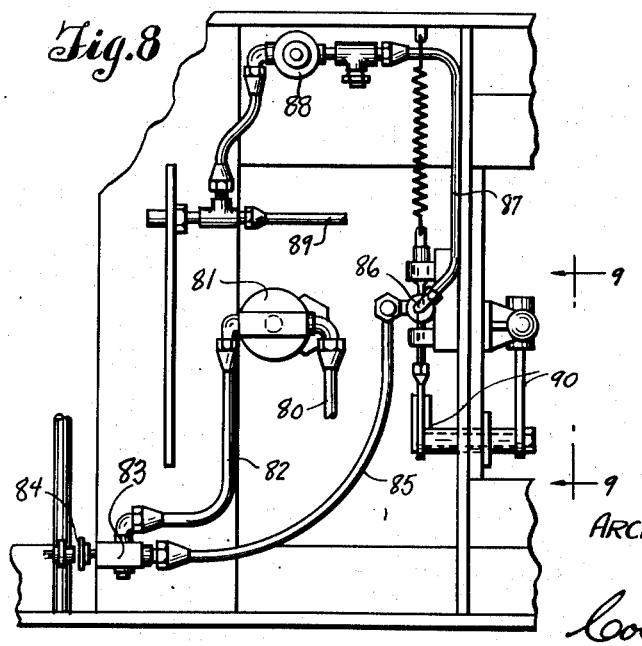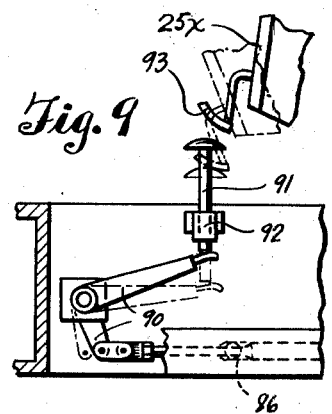

12,890,909

Patented June 16, 1959

2,890,909
SEMI TRAILER DUMP TRUCK

Archibald D. L. Hutchinson, Seattle, Wash.

Application March 12, 1956, Serial No. 571,024

8 Claims. (Cl. 298—20)

This invention relates to earth hauling vehicles and has reference more particularly to improvements in motorized road vehicles of those types wherein a tractor unit and a unitary, rear end dump body of semi-trailer character is connected to the tractor unit through the mediacy of a fifth wheel assembly.

It is the principal object of the present invention to provide an earth hauling vehicle of the above stated character, and embodying therein a novel combination of body hoisting and body guiding means through which various advantages, as later explained, are obtained.

It is also an object of the invention to provide an earth hauling vehicle of the character above stated which eliminates requirement for a trailer frame; that allows for a greater over-all length of wheel base; that requires less dumping power; that embodies therein a toggle linkage that provides stabilization and better control of the dumping operation.

Specifically stated, the primary objects and advantages of the present invention reside in the provision of an earth hauling and dumping unit as above stated wherein the tractor unit and trailer connecting mechanism is supported by and has a transverse hinge pin connection with the top member of the fifth wheel assembly, and wherein the dump body stabilizing toggle linkage extends rearwardly from said connecting mechanism and has pivotal connection with the dump body chassis forwardly of its supporting wheel assembly, thus, while serving as a draft connection for the semi-trailer dump body, its primary function is to serve for the stabilized and guided dumping of the body.

It is a further object to provide, as a part of the tractor and trailer connecting means, a cross-beam on which the forward end portion of the trailer rests in travel and which turns with the trailer, and on which cross-beam the dump body hoisting means, either singly or multiple jacks, is mounted; this being caused to maintain its transverse relationship with the dump body at all times by the use of novel toggle linkage, thus making it possible to effect a guided dumping of the body whether it be aligned with or turned to either side of the tractor unit.

It is also a primary object of this invention to apply and utilize a body guiding and stabilizing toggle linkage in the herein disclosed tractor and trailer combination that functions in accordance with the teachings of my U.S. Patent No. 2,731,293 issued on January 17, 1956.

In accomplishing these and other objects of the invention, I have provided the improved details of construction, the preferred forms of which are illustrated in the accompanying drawings, wherein:

Fig. 1 is a side view of the present load hauling vehicle, showing the dump body just slightly lifted from its normal load carrying position.

Fig. 2 is a diagrammatic layout of the hydraulic system for controlling the action of the body dumping hoists or jacks.

Fig. 3 is a side view of the present vehicle with the dump body fully raised to dumping position.

Fig. 4 is a cross-section taken on line 4—4 in Fig. 3, particularly showing the fifth wheel and the cross-beam as hingedly mounted thereon to carry the body hoists and body stabilizing toggle linkage; the dump body being shown in its fully raised position.

Fig. 4A is a view of an alternative mounting for the cross-beam which carries the body hoists.

Fig. 5 is a vertical section of the fifth wheel and hinge pin mounting of the cross-beam, taken on line 5—5 in Fig. 4.

Fig. 6 is a cross-section taken on line 6—6 in Fig. 5.

Fig. 7 is a horizontal section taken on line 7—7 in Fig. 5.

Fig. 8 is a plan, or layout, of the pneumatic brake control system.

Fig. 9 is a view taken on line 9—9 in Fig. 8 showing the automatic brake setting means.

Fig. 10 is a side view of parts of the vehicle, showing the blocks on which the bottom beams of the dump body rest when the body is in lowered position.

Referring more in detail to the drawings:

The present vehicle comprises the tractor or power unit, designated in its entirety in Figs. 1 and 3 by numeral 10, and the dump body unit which in these same views is designated in its entirety by numeral 11.

The tractor unit, in this instance, consists of a present day type of automotive truck, suitable to meet the requirements of this particular use. Generally described, it comprises the usual truck chassis 12 including front end steering wheels 13, and rear end driving wheels 14; the latter of which may be connected with the engine or prime mover of the truck in the usual or in any practical way, by means not herein shown. Mounted in the rear end portion of the chassis 12, in its central longitudinal line, is a fifth wheel mechanism which is designated in its entirety in Figs. 1 and 3 by numeral 15, which will presently be described in detail.

The dump body structure, designated by numeral 11, and as herein illustrated, comprises two laterally spaced, longitudinal I-beams 18—18 upon which the load holding body structure 19 is fixedly mounted. At their rearward ends, and under edges, the two beams 18—18 are equipped with mountings 20—20 in which a cross-axle 21 is mounted. At its opposite ends, this axle is equipped with supporting ground wheels 23 as shown.

The means which is associated with the fifth wheel structure 15 for connecting the dumping unit 11 with the tractor unit 10 comprises a strong substantial and horizontally disposed cross-beam 25 extended equally to opposite sides. This cross-beam is formed medially of its ends with a forwardly projecting portion 25x which, at its underside, has a hinged connection, presently described, with the rotating top member of the fifth wheel assembly. Extended rearwardly from this cross-beam are paired and laterally spaced draft arms 26—26, well shown in Fig. 4. At their rear ends these arms are hingedly connected by pivot shafts 27—27 extended therethrough, with the dump body structure.

It is to be understood that the draft arms 26—26 are preferably rigidly fixed to the cross-beam 25 as indicated in Fig. 4. Also, that the pivot pins 27 which connect them to the dump body structure are in transverse axial alignment and their line of connection is forward of the rear axle 21. The length of the draft arms is such that when the body is in its lowered position, as for loading or travel, the beams 18—18 rest near their forward ends upon blocks 28 fixed on the cross-beam 25 in the vertical planes of said beams.

The dumping of the body 11 is effected by paired telescopic hoists 30—30 which, at their lower ends, are mounted on the outer ends of the cross-beam 25 preferably but not necessarily, by full oscillating mounting means 31, and at their upper ends preferably but not necessarily, have full oscillating connections with opposite sidewalls of the dump body structure, as indicated at 32 in Fig. 4. When the body 11 is in its lowered position, the telescopic hoists 30 are substantially fully retracted. With the extending of the hoists, the front end of the body is lifted and as it lifts, the body and traction unit are drawn toward each other by reason of the connection as effected by the toggle arms 26—26. The dump body and arms have an upwardly breaking toggle action which causes the cross-beam 25 to be rotatably moved on its hinge axis connection with the fifth wheel. This hinge axis is somewhat forward of the vertical plane of the cross-beam. When fully lifted, the relative position of body and tractor unit is as shown in Fig. 3.

It is through the mediacy of the present toggle linkage and the means whereby it is connected to the truck and body, that the stability of the truck chassis is imparted to the dump body in a dumping operation. This will presently be explained.

The advantage of full oscillating mountings for hoists of the type herein shown resides in the fact that the jacks are not subjected to those conditions that result in wear and excessive strains; these being advantages well recognized in the industry. However, when relieved of this wear, by reason of full oscillating mountings, means other than the jacks must be employed to stabilize the body during a dumping operation. It is for this reason that the stabilizing toggle linkages and telescopic action of wheels of the present invention are of such importance to the present combination. It is possible to employ non-full oscillating jack mountings in the present instance, although not preferred, by reason of use of the body guiding and stabilizing means shown which operates to keep the jacks in line with the body movement.

Associated with the cross-beam 25 and the dump body toggle as comprised by the arms 26 and base beams 18, is a supplemental body stabilizing and equalizing toggle linkage between the cross-beam 25 and the forwardly extending end portion of the dump body structure. This toggle mechanism comprises a rigid, fabricated link 40 of substantial transverse width which, at one end, is mounted by a hinge pin 41 centrally upon the top side of cross-beam 25. This hinge pin extends longitudinally of the cross-beam and is fixed in position by a plurality of plates 42 that are fixed to the top of the beam, as noted in Fig. 4. At its outer end, the link 40 is equipped with a cross-head 43 which rotatably mounts a cross-shaft 44 wherein, on the opposite ends of which shaft paired links 46—46 are fixed. At their outer ends these shafts are pivotally fixed to the dump body under structure by pivot shafts 47—47 that are mounted in axial alignment in the base beams 18—18 of the body, and bearing blocks 48, as seen in Fig. 4. Thus, as the dump body is raised or lowered, this toggle linkage 40—46 not only operates to equalize the upward lift on opposite sides of the body as effected by the two hoists 30—30, but also prevents twisting or torsion of the body structure. This is the additional stabilizing guide and equalizer supplementing that comprised by the arms 26 and beams 18, that is quite desirable as a means of positively keeping the front end of the body in vertical alignment with the hoists and fifth wheel 15 and the truck chassis during a dumping operation.

Fixed rigidly to the cross-head 43 at the outer or swinging end of the link 40, as best seen in Fig. 1, are paired posts or legs 50 which are adapted, when the dump body has approximately reached its fully raised position, to engage against the body beams 18—18 as seen in Fig. 3, thus to check any further dumping action of the body. The tractor and dump body units will be held in this relative position so long as the pressure medium in the hoists cylinders 30—30 hold them extended. When the pressure is released, the body weight causes its automatic lowering movement, or a forward movement of the truck will pull the body down.

The fifth weel construction, and manner of hingedly mounting the cross-beam 25 thereon, is best shown in Figs. 5 and 6 wherein it is noted that the cross-beam is mounted on the top member of the fifth wheel by a hinge pin 48 which is carried at its opposite ends by laterally spaced and upwardly directed lugs 50—50 welded or otherwise fixed on the underside of the forwardly directed portion 25x of the beam. Intermediate its ends, the pin 48 has a sleeve 51 revolubly fitted thereon and this has fixed mounting, through the mediacy of flanges 52 thereon, on the disk-like top plate 53 of the fifth wheel structure. This plate has a downwardly directed pivot stud 54 fixed centrally therein that is rotatably fitted in a bearing 55 supported in the frame structure of the tractor unit; the bearing 55 being supported from the underside of a horizontal plate 56 that extends between and is fixed upon the longitudinal beams 12—12 of the tractor unit, as seen in Fig. 6. These parts, as above disclosed, constitute a non-oscillating fifth wheel assembly whereby the connection between tractor and trailing unit is effected.

It is the intent, by the present arrangement of parts, that oscillation be controlled through a range starting with no oscillation to a limited amount of oscillation, depending upon body construction and type of service. It may be permitted by providing for a certain amount of looseness of the pin 54 in its bearing 55, or through the limited oscillation of the hinge mounting of the cross-beam as now explained.

As an alternative means for mounting the cross-beam 25 on the fifth wheel plate 53, I provide the parts as shown in Fig. 4A wherein the sleeve 51 instead of being fixed to the plate 53, is supported intermediate its ends in a yoke 57 for vertical rocking on pivots 58 in right angle alignment to the sleeve. Pads 59—59 mounted on plate 53 limit the up and down oscillating movements of the link mounting.

The two hoists 30—30 are in the form of telescopic jacks, each comprising a plurality of telescopic cylindrical sections, and these are caused to be extended and retracted under control of a fluid pressure medium supplied thereto through a system illustrated in Fig. 2 wherein 60 designates a storage tank for a hydraulic pressure medium; 61 designates a pump which may be operated by a power take-off from the engine of the tractor unit, or by other suitable means to effect circulation of the pressure medium, drawn from the tank through a valve mechanism 62. This valve mechanism has an adjustment control lever 63 whereby it may be positioned to cause the pump to deliver the pressure medium through a pipe 65 to a header 66 from which it is discharged through flexible conducts 67—67 to the lower ends of the hydraulic hoists 30—30. The extending of the hoists may be stopped and held at any position by proper setting of the valve lever. Also, the valve may be so adjusted as to allow the pressure medium to flow back through these pipes to the tank from the hoists thus to lower the dump body. Also, the valve may be set on a "hold" position to maintain the body in raised position if desired.

It will be understood by reference to Figs. 1 and 3 that as the jacks 30—30 are extended, the pivotally joined body guiding arms 26—26 and the dump body will have an upwardly breaking toggle action which causes a relative movement, toward each other, of the rear wheels of the tractor unit and those of the dump body. Also, as the body guiding arms swing upwardly, the cross-beam 25 has an upward swing movement since it is located rearward of the hinge pin 48 whereby the beam is mounted on the fifth wheel. This upward swinging movement of the cross-beam 25 causes the paired hoists to be lifted accordingly. Therefore, the overall length of jacks required for full lifting of the dump body will be shortened accordingly.

It is further to be explained that during a load dumping action of the body, it is generally required or desired that the rear wheels of either the tractor unit or dump body be held against rotation; this being accomplished through the usual wheel braking facilities. If the dump body wheels 23 are held against rotation, the truck wheels 14 should not be held, and vice-versa. If neither set of wheels are held, then in a dumping operation, the truck may move rearward, or the dump body may move forwardly, or both truck and body may move toward each other.

It is desirable also that a means be provided whereby the brakes of the free moving wheels be set just prior to the time the dump body reaches its fully raised position so that the vehicle will not be driven forwardly at a rate that will cause shock. In the present instance this is accomplished by an application of air to the wheel braking cylinders. In Fig. 8, a pressure medium supply line is designated at 80, and this is connected through check valve 81 and pipe line 82 with a valve 83 which is manually controlled by means indicated at 84.

Valve 83 has a line 85 leading therefrom to a valve 86 which controls the wheel braking operation; this valve 86 has a line 87 leading therefrom through a check valve 88 to the brake line 89.

It is shown in Fig. 9 that the valve 86 is controlled by a lever mechanism 90, which is disposed for actuation by a plunger 91 that is mounted in a guide bearing 92. The plunger is supported in the frame structure of the vehicle 10, just forward of the fifth wheel 15. A contact finger 93 is fixed on the forward side of the cross-beam head 25x in such position that when the beam 25 tilts upwardly with the body dumping operation, the finger 93 ultimately presses down on the plunger 91 and opens valve 86 to cause the application of braking medium at the proper time which should be just prior the time the body reaches its full dumping position.

It can be understood by reference to Figs. 1 and 3 that in a dumping operation, the toggle linkage comprised by the pivotally joined guide arms 26—26 and bottom beams 18 of the dump body structure and which pivots about the supporting wheel assembly and axis of the cross-beam mounting hinge, serves as a body stabilizing and equalizing structure in the same manner as does the toggle linkage of my U.S. Patent No. 2,731,293 previously mentioned. The type of mounting for the cross-beam 25 on the fifth wheel, whether as in Fig. 5 or in Fig. 4A, is determined by the type of dump body construction. If it be such as to allow a reasonable amount of flexibility, then the mounting can be as in Figs. 5 and 6. If necessary, slight freedom of movement of the pivot pin 54 in its bearing can be provided. If the dump body structure is perfectly rigid, and does not permit any yielding, then it may be desirable that some movement be allowed such as that provided for by the mounting of Fig. 4A.

The present invention has, by incorporating therein the toggle linkage comprised by the body guiding arms 26—26 and body beams 18—18, provided a means to maintain stability of the lower end portion of the dump body structure between the rear end wheel assembly and the transverse line of the pivot pin connections 27—27. By the incorporation of the additional toggle, comprised by parts 40 and 46, the forward and less stabilized end portion of the body is guided and stabilized in its movement by keeping it in alignment with the mountings of the hoists, and tractor chassis. This also allows for mounting jacks with less clearance. The stability imparted to the dump body of such a unit as described is of utmost importance as present dump trailers tend to be impractical because of instability in dumping in many operations. To maintain stability by keeping the forward or raised end of trailer in a plane controlled by truck chassis is of major importance.

The two toggle linkages, either singly or in combination, serve as guiding and equalizing means for the body during a dumping operation, thus relieving the hoisting jack or jacks of strain and wear in accordance with the teaching of my prior Patent No. 2,731,293.

What I claim as new is:

1. In combination, a motorized truck, a semi-trailer dump body with a supporting wheel assembly at its rear end on which said body pivots in dumping, a fifth wheel mechanism mounted in the truck chassis, a cross-beam mounted by and fixed to the fifth wheel by a hinge axis that is parallel to the beam; said dump body having its forward end portion extended across said cross-beam for support thereon and to a distance forward thereof, paired body guiding draft arms fixed rigidly to the cross-beam at opposite sides of the fifth wheel and extended rearwardly therefrom and pivotally fixed at their ends to the dump body structure at transversely aligned points substantially forward of said supporting wheel assembly, body hoisting means on the cross-beam having lifting connection with the forward end portion of said body, and an extendable and retractable body guiding toggle linkage hingedly mounted at its lower end on said cross-beam and hingedly connected at its upper end with the forward end portion of said dump body.

2. The combination recited in claim 1 wherein said body guiding toggle linkage comprises an upper pair and a lower pair of links; said pairs of links being hingedly joined for a forwardly breaking action of the linkage with the lowering of said dumping body and movable toward a position of alignment when the body moves to dumping position, and a stop member applied to links of one of said pairs to engage with the body, thereby to stop farther extending of the linkage and the upward swing of the body in dumping.

3. In combination, a motorized truck, a semi-trailer dump body with a supporting wheel assembly at its rear end on which said body pivots in dumping, braking means for the wheels of said truck and of said dump body, a fifth wheel mechanism mounted in said truck chassis, a cross-beam mounted by and fixed to the fifth wheel by a horizontal hinge axis that is forwardly of said cross-beam; said dump body having its forward end portion extended across said cross-beam for support thereon, and to a distance substantially forward thereof, paired, laterally spaced body guiding arms fixed rigidly to said cross-beam and extended rearwardly therefrom and having pivotal connection at their ends with the dump body structure to pivot about a transverse axial line that is substantially midway between the said wheel assembly and the hinge axis on which said cross-beam is mounted, body hoists mounted on the opposite ends of said cross-beam and having full oscillating connections at their lower ends therewith, and having full oscillating connections at their upper ends with opposite sides of said dump body, means for applying pressure medium to said hoists to lift said dump body, a body stabilizing and lift equalizing toggle linkage hingedly mounted at one end on said cross-beam, and hingedly connected at its other end to the forward end of said dump body, means on said toggle linkage adapted to contact with the dump body to limit the extent of extension of the toggle linkage thus to limit the dumping travel of said body, and means operable by the said toggle linkage to apply the brakes of said truck and dump body at a predetermined position of dumping of said body.

4. In combination, a power driven truck, a rigid dump body with a supporting wheel assembly at its rear end including a horizontal axis about which the body turns in dumping, a fifth wheel mounted in the truck chassis having its top plate mounted to turn about a vertical axis, a rigid toggle fixed at its forward end by a transverse, horizontal hinge axis to the top plate of said fifth wheel;

said toggle comprising a pair of laterally spaced and coextensive arms, a forward end member rigidly joining said arms at their forward ends; said arms being hingedly fixed at their rearward ends to the dump body by a horizontal hinge axis forwardly of said wheel assembly, and body hoisting means supported on said forward end member of the toggle and having a lifting connection with the forward end portion of the dump body; said toggle serving to guide the body vertically in its dumping movements and prevent the body hoisting means being subjected to body guiding strain.

5. The combination recited in claim 4 wherein said forward end member of said toggle comprises a cross beam that extends beyond the opposite side limits of the dump body, and wherein the body hoisting means are mounted on the opposite ends of said cross beam.

6. The combination recited in claim 4 wherein said forward end member of the toggle comprises a cross beam that extends at its ends beyond the opposite side limits of the dump body and is located rearward of the pivot axis whereby the toggle is hinged to said top plate, and wherein said body hoisting means comprises telescopic jacks that are mounted on the outer ends of said cross-beam.

7. In combination, a motorized truck equipped with a fifth wheel having a top plate mounted for turning about a vertical axis, a rear end dump body having a support at its rear end for travel and for dumping, a horizontal cross-beam supported on said top plate with its opposite end portions extended to opposite sides of the dump body, and multiple sleeve telescopic hoists mounted on the opposite end portions of said cross-beam and having lifting connection with the forward end portion of the dump body for dumping it.

8. The combination of claim 7 wherein the cross-beam has pivotal mounting on said top plate adapting it for lateral tilting movement in opposite directions, and said dump body rests thereon in travel and means is provided on the plate for limiting the extent of said lateral tilting to that required to accommodate the connection between cross-beam and top plate to normal variations in the surface of the road way over which the truck travels.

References Cited in the file of this patent

UNITED STATES PATENTS

| | | |
|---|---|---|
| 182,040 | Spielman | Sept. 12, 1876 |
| 2,166,722 | Kirksey | July 18, 1939 |
| 2,309,787 | Quintin et al. | Feb. 2, 1943 |
| 2,539,086 | Kirksey | Jan. 23, 1951 |
| 2,605,134 | Clement et al. | July 29, 1952 |
| 2,628,126 | Black | Feb. 10, 1953 |
| 2,635,919 | Watson | Apr. 21, 1953 |
| 2,661,236 | Schonrock | Dec. 1, 1953 |
| 2,698,199 | Godbersen | Dec. 28, 1954 |
| 2,846,267 | Fields | Aug. 5, 1958 |